United States Patent [19]

Bobb et al.

[11] Patent Number: 5,461,926
[45] Date of Patent: Oct. 31, 1995

[54] SINGLE-ENDED OPTICAL FIBER STRAIN SENSOR FOR MEASURING MAXIMUM STRAIN

[75] Inventors: Lloyd C. Bobb, Horsham; Howard D. Krumboltz, Chalfont, both of Pa.

[73] Assignee: The United States of America as represented by the Secretary of the Navy, Washington, D.C.

[21] Appl. No.: 269,473

[22] Filed: Jun. 30, 1994

[51] Int. Cl.⁶ .............................. G02B 6/02; H01D 5/16
[52] U.S. Cl. .............................. 73/800; 73/770; 73/775; 250/227.15; 250/227.16; 356/34
[58] Field of Search .............................. 73/800, 762, 770, 73/775; 356/32, 34, 35; 250/227.14, 227.15, 227.16

[56] References Cited

U.S. PATENT DOCUMENTS

| 4,761,073 | 8/1988 | Meltz et al. | 356/32 |
|---|---|---|---|
| 4,928,004 | 5/1990 | Zimmermann et al. | 250/227.14 |
| 4,947,693 | 8/1990 | Szuchy et al. | 73/800 |
| 5,044,205 | 9/1991 | Wolff et al. | 73/800 |
| 5,089,697 | 2/1992 | Prohaska | 250/227.21 |
| 5,132,529 | 7/1992 | Weiss | 250/227.16 |
| 5,182,449 | 1/1993 | Johnson et al. | 250/227.14 |
| 5,345,519 | 9/1994 | Lu | 385/12 |

Primary Examiner—Richard Chilcot
Assistant Examiner—George M. Dombroske
Attorney, Agent, or Firm—James V. Tura; Susan E. Verona

[57] ABSTRACT

An optical fiber strain sensor is provided which remembers the maximum strain a structure has experienced in a given timeframe. A reflective surface is fixed at one location on the structure, and a multi-mode optical fiber with a flat end is fixed at another location on the structure and is positioned so that its flat end is in contact with the reflective surface. A microbore capillary tube attached to the reflective surface encloses the fiber at its flat end and frictionally retains it in contact with the reflective surface. Increasing strain in the structure pulls the fiber end away from the reflective surface in proportion to the amount of strain; however, when strain is decreasing, the fiber buckles rather than moving closer to the reflective surface. Therefore, the maximum strain is reflected as a maximum distance between the fiber end and the reflective surface. When the maximum strain experienced is to be measured, light is launched into the free end of the fiber and reflected back through the fiber by the reflective surface. Its intensity is then detected and measured. The intensity of light transmitted to the detector will vary inversely with the distance between the fiber end and the reflective surface; therefore, this distance can be measured and correlated with strain to a high degree of accuracy.

6 Claims, 3 Drawing Sheets

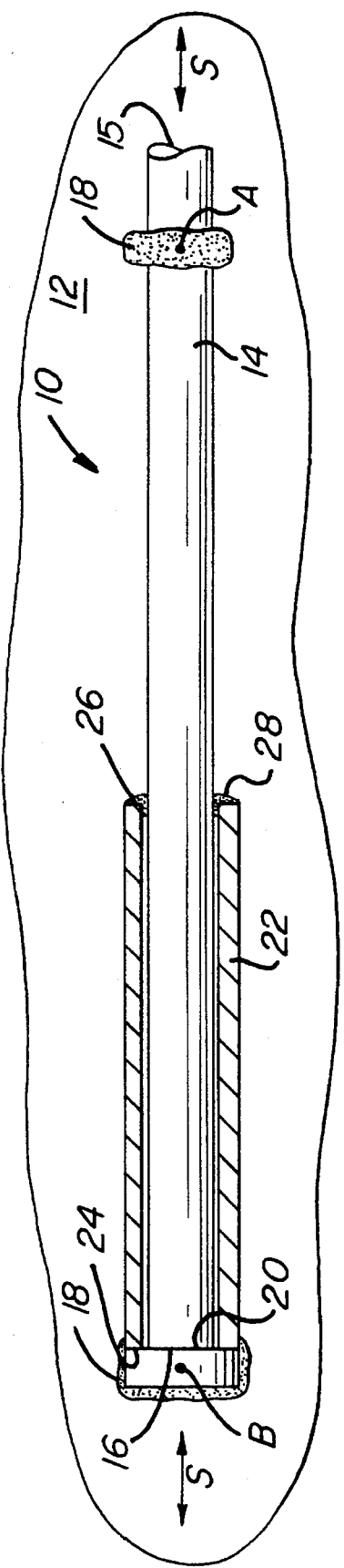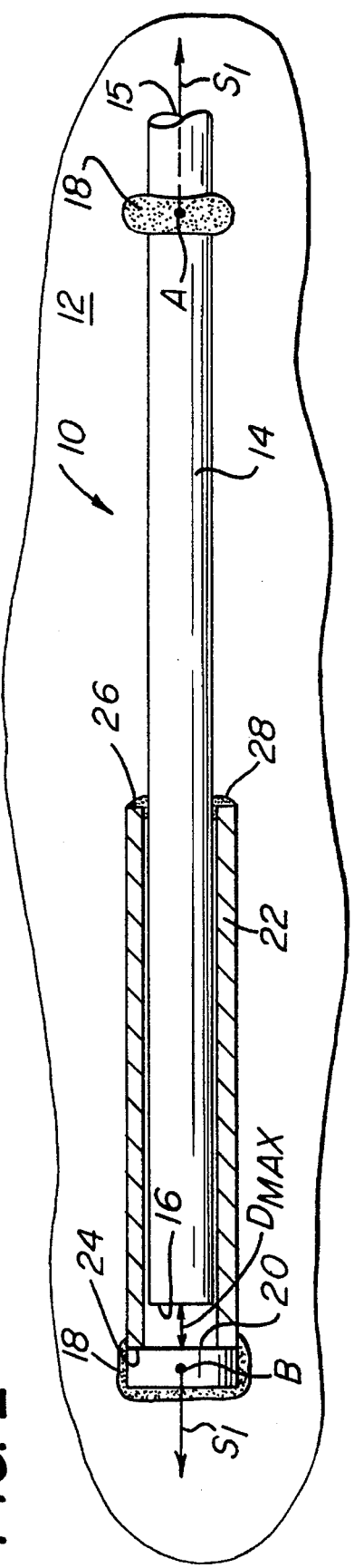
FIG. 1
FIG. 2

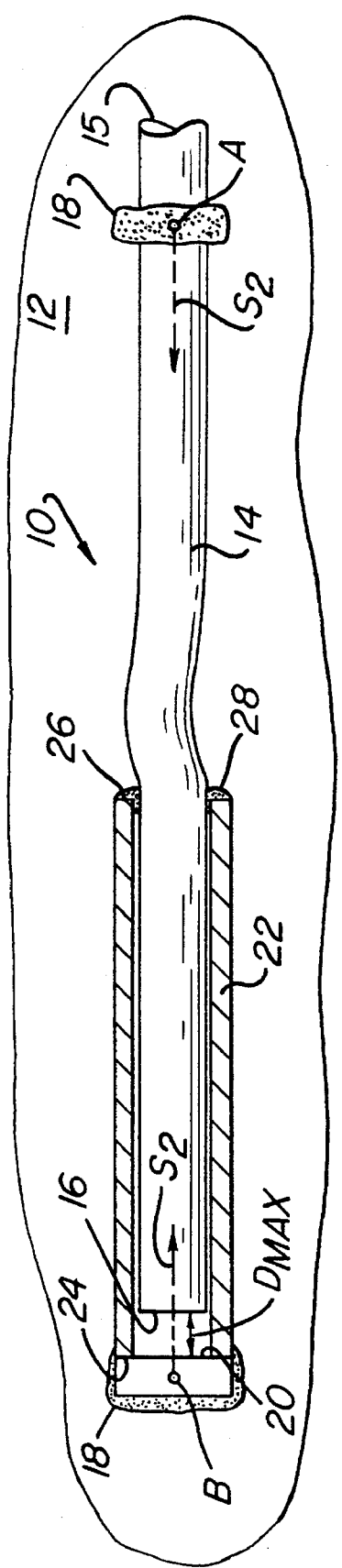
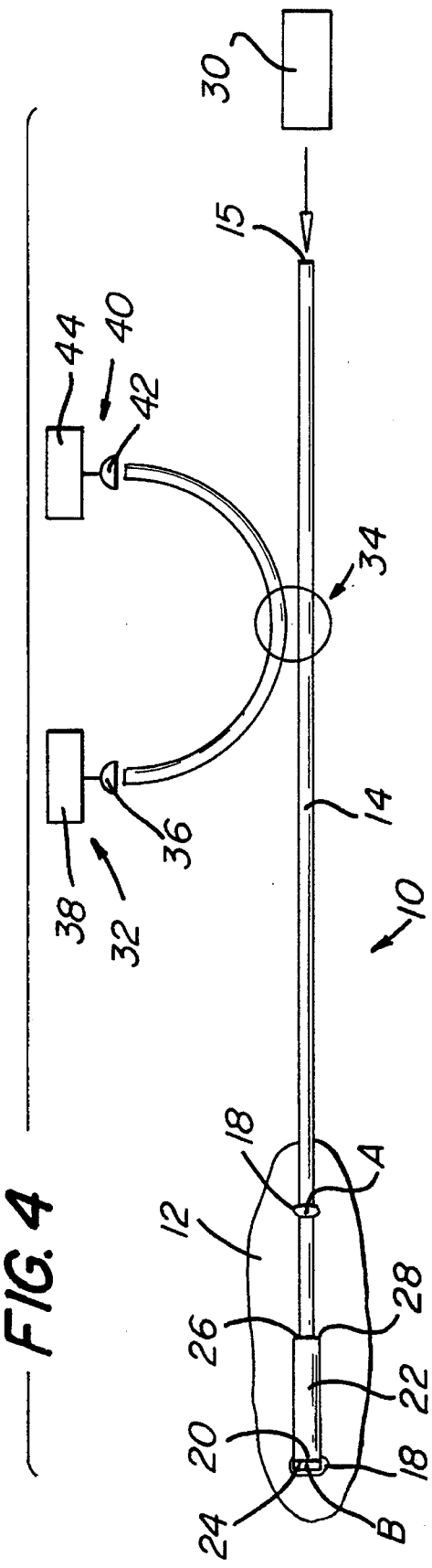

SINGLE-ENDED OPTICAL FIBER STRAIN SENSOR FOR MEASURING MAXIMUM STRAIN

STATEMENT OF GOVERNMENT INTEREST

The invention described herein may be manufactured and used by and for the Government of the United States of America for governmental purposes without the payment of any royalties thereon or therefor.

BACKGROUND OF THE INVENTION

The present invention relates generally to a sensor for measuring displacement, and more particularly to an optical fiber strain sensor.

It is often desirable to monitor strain in a structure, such as a bridge or highway overpass, a building, or a component in a vehicle, in order to get advance warning of fracture or other failure of the structure. However, it is not always convenient (or even necessary) to monitor the strain as it is occurring, and it is sufficient to know merely the maximum strain the structure has experienced in a given timeframe. For example, for vehicles such as aircraft, weight, space and other limitations would preclude monitoring strain of components therein in real time, but for purposes of evaluating the likelihood of future failure, it would be sufficient to know the maximum strain the component in the vehicle experienced during a particular trip. Therefore, it would be convenient to have a means of sensing and maintaining for later measurement the maximum strain the component experienced.

Optical fiber sensors for measuring strain are known in the art, and have many advantages over other types of sensors. They are economical, durable, light-weight, and can be used in electromagnetically noisy environments, and are therefore ideal for use in aircraft. Currently-used optical fiber sensors either require active and continuous recording of the strain in real time or are of the on-off type wherein the optical fiber fails at a predetermined strain level. None of them provides a maximum strain measurement without continuous monitoring.

SUMMARY OF THE INVENTION

It is therefore an object of the present invention to provide an optical fiber strain sensor which can monitor the maximum strain a structure has experienced in a given timeframe and maintain it for later measurement.

It is another object of the present invention to provide a simple, durable, inexpensive, light-weight, and highly accurate strain sensor.

These and other objects are accomplished by apparatus for sensing and retaining for later measurement the maximum displacement in a given direction which has occurred between a first location and a second location. The apparatus comprises an optical waveguide capable of transmitting light therethrough and having a flat end, attachable on a portion of the outer surface thereof to the first location, and a reflective surface attachable to the second location and positioned so that the flat end of the optical waveguide is in contact with the reflective surface when the waveguide is taut. A tube having two ends is attached at one end thereof to the reflective surface and slidably encloses the flat end of the optical waveguide therein, retaining the waveguide in position. The displacement pulls the flat end away from the reflective surface and friction between the waveguide and the tube retains the maximum distance they separate. This maximum distance correlates with the maximum displacement and can be measured by launching light of a known intensity into the optical waveguide and then measuring the intensity of the light emerging therefrom.

Other objects, advantages, and novel features of the invention will become apparent from the following detailed description of the invention when considered in conjunction with the accompanying drawings.

BRIEF DESCRIPTION OF THE DRAWINGS

FIG. 1 is a pictorial cross-section of the optical fiber strain sensor of the present invention mounted on a structure in which maximum strain is to be measured.

FIG. 2 is a pictorial cross-section of the optical fiber strain sensor of FIG. 1 after the structure has undergone strain in a given direction.

FIG. 3 is a pictorial cross-section of the optical fiber strain sensor of FIG. 2 after the structure has undergone a reduction in strain from that shown in FIG. 2.

FIG. 4 is a schematic illustration of the optical fiber strain sensor of FIG. 1 showing apparatus for later measurement of the maximum strain.

DESCRIPTION OF THE PREFERRED EMBODIMENT

Figure 5:
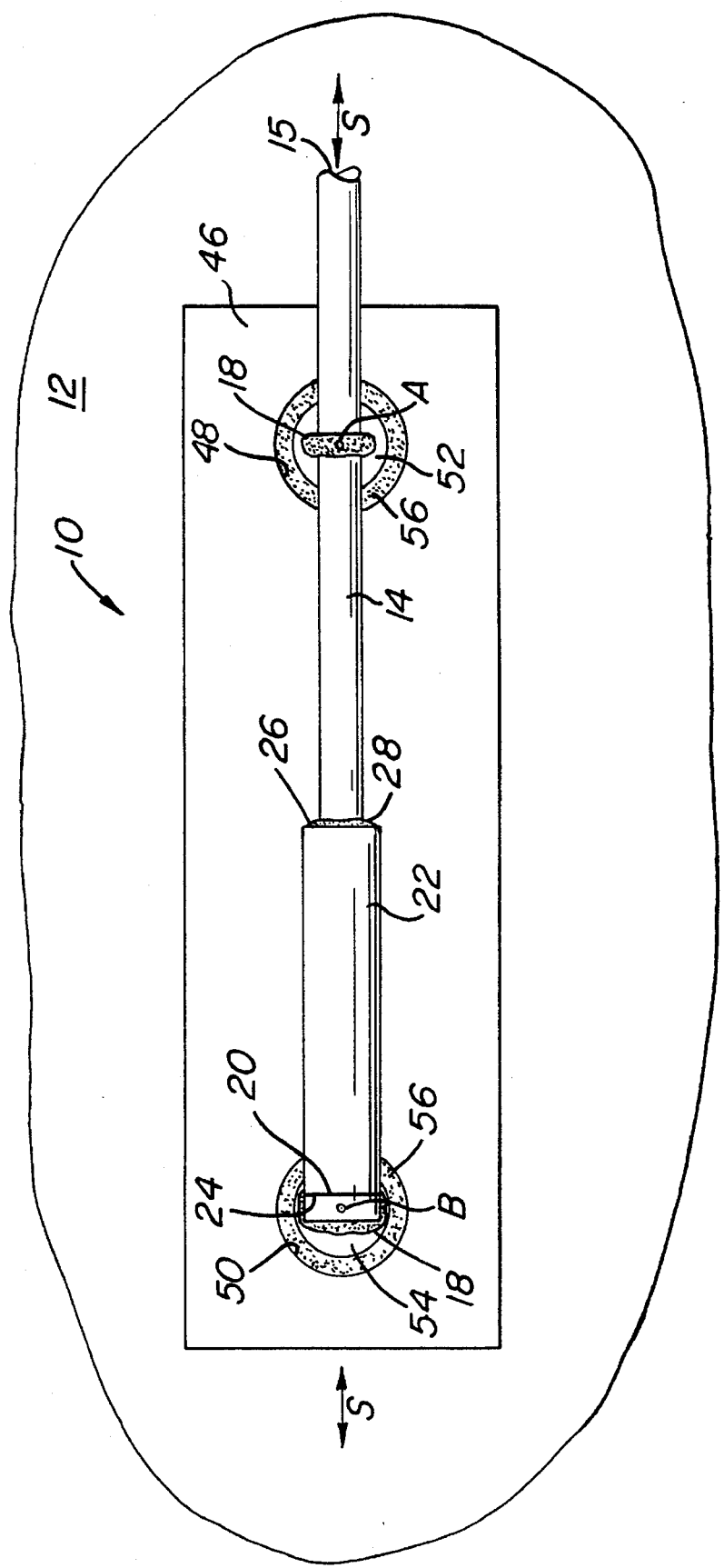
FIG. 5 is a pictorial view of an alternate embodiment of the optical fiber strain sensor of the present invention.

Referring now to the drawings, wherein like characters represent like or corresponding parts throughout the several views, one sees in FIG. 1 one embodiment of the optical fiber strain sensor 10 of the present invention being used to sense the strain in a structure 12. The strain to be measured is that which occurs in the known distance between points A and B in the direction shown by arrows S. An optical waveguide or fiber 14 having a free end 15 and a flat end 16 is fixed, such as by an adhesive 18 like epoxy, to structure 12 at point A on the structure, and is positioned so that flat end 16 just extends to point B when the fiber is taut. A reflective surface 20 is fixed, such as by an adhesive 18 like epoxy, to structure 12 at point B on the structure, and is positioned so that fiber 14 is perpendicular thereto and in contact therewith across its entire flat end 16. Flat end 16 should be perpendicular to the axis of fiber 14, and should be as smooth as possible. Carefully cleaving or cleaving and polishing flat end 16 should be sufficient. Optical fiber 14 should preferably be multi-mode as opposed to single-mode, since multi-mode fibers are generally easier to handle and have less expensive associated components.

Fiber 14 is initially retained in this position relative to reflective surface 20 by a microbore capillary tube 22 having two ends 24 and 26, which is attached at one end 24 thereof to reflective surface 20 and which encloses flat end 16 of fiber 14 therein. The inner diameter of tube 22 nearly matches the outer diameter of fiber 14, which is slidable therein. Some clearance is required to allow air to flow between fiber 14 and tube 22. Tube 22 is shorter than the distance between points A and B, leaving some of fiber 14 unenclosed near point A.

Fiber 14 is in frictional contact with tube 22 at some point along the distance over which the tube encloses the fiber, that point preferably being at end 26 of the tube, as shown in FIG. 1. This frictional contact initially retains the fiber in contact with reflective surface 20. Frictional contact between tube 22 and fiber 14 may be established by providing a non-elastic adhesive 28 such as wax between the fiber and the tube at end 26, effectively reducing the inner diameter of the tube at its end to the outer diameter of the fiber. The frictional contact formed should be such that the frictional force can be overcome by the strain in structure 12 before fiber 14 breaks and before the bond between the fiber and the structure breaks. The bonding force between fiber 14 and structure 12 can be increased by applying adhesive 18 over more fiber surface area at point A. Fiber 14 is pretensioned after being adhered to tube 22 and before being adhered to structure 12 to make it taut.

In operation, structure 12 will strain in direction $S_1$, shown in FIG. 2, pulling fiber 14 and reflective surface 20 from points A and B. The frictional force at end 26 of tube 22 will be overcome and flat end 16 will move away from reflective surface 20. FIG. 2 shows sensor 10 and structure 12 under such a first maximum strain condition. Flat end 16 and reflective surface 20 have separated by a distance $D_{max}$.

FIG. 3 shows sensor 10 and structure 12 after the strain has been reduced from that shown in FIG. 2, and so points A and B have moved in the direction $S_2$. Fiber 14 has buckled (shown pictorially to exaggerate the effect) between its attachment point at A and its point of entry into tube 22 at end 26. Fiber 14 buckles instead of sliding back into tube 22 because the frictional force between the fiber and the tube exceeds the buckling load. The buckling load is low because the slenderness ratio of fiber 14 is high. Since fiber 14 does not slide back into tube 22, the distance $D_{max}$ between flat end 16 and reflective surface 20 is retained or "remembered". The frictional force and the small clearance between tube 22 and fiber 14 is sufficient to hold $D_{max}$ constant. If structure 12 were to again strain in the direction $S_1$ shown in FIG. 2 to a greater extent than the previous strain $S_1$, fiber 14 would further pull out of tube 22, separating the distance between flat end 16 and reflective surface 20. A new $D_{max}$ would thus be created. In this way, sensor 10 retains the maximum strain position for later measuring.

The maximum strain experienced by structure 12, which directly correlates with the distance $D_{max}$ between flat end 16 and reflective surface 20, can be ascertained with apparatus such as that shown in FIG. 4. Light of a known intensity from a light source 30 such as an IR laser diode or LED is launched into free end 15 of fiber 14 so that it propagates therethrough in the direction of reflective surface 20. A known fraction of the light intensity from light source 30 is also directed to a first light intensity measuring means 32 via an optical fiber coupler 34, to monitor the light's intensity. First light intensity measuring means 32 may be a first silicon photodiode 36 connected to a first detection circuit 38. The light then reflects off reflective surface 20, is collected by fiber 14 through flat end 16, and propagates back through the fiber. The intensity of that reflected light decreases as the distance between fiber 14 and reflective surface 20 increases, since proportionately less of the reflected light is collected by the fiber with increasing distance. Optical fiber coupler 34 removes from fiber 14 a known fraction of the reflected light intensity propagating therethrough for measurement, and directs it to a second light intensity measuring means 40 such as a second silicon photodiode 42 connected to a second detection circuit 44. The intensity of transmitted light is very sensitive to the distance apart of flat end 16 and reflective surface 20, so strain can be measured to a high degree of accuracy. Of course, sensor 10 must be calibrated in order to correlate strain with light intensity.

FIG. 5 shows another embodiment of the invention which includes a substrate 46, upon which fiber 14 and reflective surface 20 are mounted, which makes sensor 10 more easily handled as a unit separate from structure 12. Substrate 46 has two holes 48 and 50 therethrough, which are positioned to align with points A and B, respectively, on structure 12 when the substrate is attached thereto. Two floating pads 52 and 54 are positioned in holes 48 and 50, respectively, and are sized to be smaller than the holes. Pads 52 and 54 are movably connected to subtrate 46 by an elastic adhesive 56 such as silicone rubber between their outer perimeters and the inner edges of holes 48 and 50. Substrate 46 is fixed to structure 12 via pads 52 and 54, which are rigidly fixed, such as by epoxy or cement, to the structure at respective points A and B. Pads 52 and 54 therefore move with points A and B when structure 12 experiences strain. Fiber 14, reflective surface 20, and tube 22 are positioned on substrate 46 in the same manner as they are positioned on structure 12 in the previously discussed embodiments, with fiber 14 being fixed to pad 52 with adhesive 18, and reflective surface 20 being fixed to pad 54 with adhesive 18. Holes 48 and 50 and pads 52 and 54 are sized such that there is sufficient space between the outer perimeters of the pads and the inner edges of the holes for the pads to move within substrate 46 when structure 12 is strained.

Some of the many advantages of the present invention should now be readily apparent. For instance, a simple, durable, inexpensive, light-weight, and highly accurate strain sensor has been provided. Furthermore, an optical fiber strain sensor has been provided which can monitor the maximum strain a structure has experienced in a given timeframe and maintain it for later measurement without the need for continuous recording of the strain in real time.

Those skilled in the art will appreciate without any further explanation that many modifications and variations are possible to the above-disclosed optical fiber strain sensor, within the concept of this invention. Consequently, it should be understood that all such modifications and variations fall within the scope of the following claims.

What is claimed is:

1. Apparatus for sensing and retaining for later measurement the maximum displacement in a given direction which has occurred between a first location and a second location, comprising:

an optical waveguide capable of transmitting light therethrough and having a flat end, attachable on a portion of the outer surface thereof to the first location;

a reflective surface attachable to the second location and positioned so that the flat end of said optical waveguide is in contact with said reflective surface;

a tube having two ends, attached at one end thereof to said reflective surface for slidably enclosing the flat end of said optical waveguide therein; and means for providing a frictional force between said optical waveguide and said tube, the frictional force being of a magnitude that allows said optical waveguide to slide with respect to said tube when the displacement increases the distance between the first and second locations, but does not allow said waveguide to slide with respect to said tube when the displacement decreases the distance between said first and second locations.

2. Apparatus for sensing and retaining for later measurement the maximum strain in a given direction which has occurred in a structure, comprising:

an optical waveguide capable of transmitting light therethrough and having a cleaved end, fixed on a portion of its outer surface to the structure at a first location;

a reflective surface fixed to the structure at a second location a known distance and in a known direction from the first location, and positioned so that the cleaved end of said optical waveguide is in contact with said reflective surface;

a tube having two ends, fixed at one end thereof to the reflective surface and slidably containing said optical waveguide therein; and means for providing a frictional force between said tube and said optical waveguide, the frictional force being of a magnitude that allows said optical waveguide to slide with respect to said tube when the displacement increases the distance between the first and second locations, but does not allow said waveguide to slide with respect to said tube when the displacement decreases the distance between said first and second locations.

3. Apparatus for sensing and retaining for later measurement the maximum strain experienced by a structure in a given direction between first and second locations thereon a known distance apart, comprising:

a rigid substrate having first and second movable pads therein, which first and second pads are attachable to the structure at the first and second locations thereon, respectively;

an optical waveguide capable of transmitting light therethrough and having a flat end, attached on a portion of the outer surface thereof to the first pad and sized and positioned so that the flat end reaches the second location when said optical waveguide is taut;

a reflective surface attached to the second pad and positioned so that the flat end of said optical waveguide is in contact with the reflective surface when said optical waveguide is taut;

a tube having two ends, fixed at one end thereof to said reflective surface and slidably enclosing the flat end of said optical waveguide therein; and means for providing friction between said optical waveguide and said tube;

whereby strain experienced by the structure moves the movable pads, pulling said optical waveguide away from said reflective surface, which optical waveguide slides with respect to said tube, thereby pulling the flat end of said optical waveguide a distance away from said reflective surface, and said means for providing friction retains the distance and prevents the flat end from moving back towards said reflective surface.

4. The apparatus of claim 3, wherein said means for providing friction is a non-elastic adhesive positioned between said optical waveguide and said tube.

5. The apparatus of claim 3, further comprising means for measuring the distance between the flat end of said optical waveguide and said reflective surface as an indication of the maximum strain experienced by the structure.

6. The apparatus of claim 5, wherein said means for measuring the distance between the flat end of said optical waveguide and said reflective surface comprises means for launching light of a known intensity into said optical waveguide, and means for measuring the intensity of the light emerging from said optical waveguide, the difference in intensity between the launched and emerging light correlating with the distance.

* * * * *